(12) United States Patent
Ramabadran

(10) Patent No.: US 7,027,979 B2
(45) Date of Patent: Apr. 11, 2006

(54) METHOD AND APPARATUS FOR SPEECH RECONSTRUCTION WITHIN A DISTRIBUTED SPEECH RECOGNITION SYSTEM

(75) Inventor: Tenkasi Ramabadran, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 381 days.

(21) Appl. No.: 10/341,726

(22) Filed: Jan. 14, 2003

(65) Prior Publication Data

US 2004/0138888 A1    Jul. 15, 2004

(51) Int. Cl.
*G10L 19/14* (2006.01)

(52) U.S. Cl. .............. 704/205; 704/256; 704/243; 704/234; 706/14

(58) Field of Classification Search ........... 704/256, 704/252, 243, 236, 240, 234, 233, 211, 207, 704/205, 203; 706/14
See application file for complete search history.

(56) References Cited

U.S. PATENT DOCUMENTS 5,745,874 A * 4/1998 Neely ................... 704/232
6,076,058 A * 6/2000 Chengalvarayan ......... 704/256
6,157,909 A * 12/2000 Mauuary et al. .......... 704/228
6,633,839 B1 * 10/2003 Kushner et al. ........... 704/205
6,691,090 B1 * 2/2004 Laurila et al. ............ 704/250
6,721,698 B1 * 4/2004 Hariharan et al. ......... 704/203
2002/0147579 A1    10/2002 Kushner et al.

FOREIGN PATENT DOCUMENTS

WO    WO-01/33550 A1 *  5/2001
WO    WO-02/062120 A2 *  8/2002

OTHER PUBLICATIONS

Chazan et al., ("Speech reconstruction from mel frequency cepstral coefficients and pitch frequency", Proceedings'00, 2000 IEEE International Conference on Acoustics, Speech, and Signal Processing, 2000, vol. 3, pp. 1299-1302).*

Kang et al., ("A phase generation method for speech reconstruction from spectral envelope and pitch intervals", Proceedings'0 IEEE International Conference on Acoustics, Speech, and Signal Processing, 2002, vol. 1, pp. 429-432).*

* cited by examiner

*Primary Examiner*—Vijay Chawan
(74) *Attorney, Agent, or Firm*—Kenneth A. Haas; Sylvia Chen

(57) ABSTRACT

A method and apparatus for speech reconstruction within a distributed speech recognition system is provided herein. Missing MFCCs are reconstructed and utilized to generate speech. Particularly, partial recovery of the missing MFCCs is achieved by exploiting the dependence of the missing MFCCs on the transmitted pitch period P as well as on the transmitted MFCCs. Harmonic magnitudes are then obtained from the transmitted and reconstructed MFCCs, and the speech is reconstructed utilizing these harmonic magnitudes.

20 Claims, 3 Drawing Sheets

METHOD AND APPARATUS FOR SPEECH RECONSTRUCTION WITHIN A DISTRIBUTED SPEECH RECOGNITION SYSTEM

FIELD OF THE INVENTION

The present invention relates generally to speech reconstruction and in particular, to a method and apparatus for speech reconstruction within a distributed speech recognition system.

BACKGROUND OF THE INVENTION

Automatic speech recognition (ASR) is the method of automatically recognizing the nature of oral instructions based on the information included in speech waves. ASR has ushered in a new generation of security devices based on oral, rather than physical, keys and has made possible a whole range of "no-hands" or "hands-free" features, such as voice dialing and information retrieval by voice.

At the highest level, all ASR systems process speech for feature extraction (also known as signal-processing front end) and feature matching (also known as signal-processing back end). Feature extraction is the method by which a small amount of data is extracted from a speech input to represent the speech input. Feature matching is the method by which the nature of instructions contained in the speech input are identified by comparing the extracted data with a known data set. In a standard ASR system, a single processing unit carries out both of these functions.

The performance of an ASR system that uses speech transmitted, for example, over a mobile or wireless channel as an input, however, may be significantly degraded as compared with the performance of an ASR system that uses the original unmodified speech as the input. This degradation in system performance may be caused by distortions introduced in the transmitted speech by the coding algorithm as well as channel transmission errors.

A distributed speech recognition (DSR) system attempts to correct the system performance degradation caused by transmitted speech by separating feature extraction from feature matching and having the two methods executed by two different processing units disposed at two different locations. For example, in a DSR mobile or wireless communications system or network including a first communication device (e.g., a mobile unit) and a second communication device (e.g., a server), the mobile unit performs only feature extraction, i.e., the mobile unit extracts and encodes recognition features from the speech input. The mobile unit then transmits the encoded features over an error-protected data channel to the server. The server receives the encoded recognition features, and performs only feature matching, i.e., the server matches the encoded features to those in a known data set.

With this approach, coding distortions are minimized, and transmission channel errors have very little effect on the recognition system performance. Moreover, the mobile unit has to perform only the relatively computationally inexpensive feature extraction, leaving the more complex, expensive feature matching to the server. By reserving the more computationally complex activities to the server processor, greater design flexibility is preserved for the mobile unit processor, where processor size and speed typically are at a premium given the recent emphasis on unit miniaturization.

The European Telecommunications Standards Institute (ETSI) recently published a standard for DSR feature extraction and compression algorithms. European Telecommunications Standards Institute Standard ES 201 108, *Speech Processing, Transmission and Quality aspects (STQ); Distributed speech recognition; Front-end feature extraction algorithm; Compression algorithms*, Ver. 1.1.2, April 2000 (hereinafter "ETSI Front-End Standard"), hereby incorporated by reference in its entirety. While several methods, such as Linear Prediction (LP), exist for encoding data from a speech input, the ETSI Front-End Standard includes a feature extraction algorithm that extracts and encodes the speech input as a log-energy value and a series of Mel-frequency cepstral coefficients (MFCC) for each frame. These parameters essentially capture the spectral envelope information of the speech input, and are commonly used in most large vocabulary speech recognizers. The ETSI Front-End Standard further includes algorithms for compression (by vector quantization) and error-protection (cyclic redundancy check codes). The ETSI Front-End Standard also describes suitable algorithms for bit stream decoding and channel error mitigation. At an update interval of 10 ms and with the addition of synchronization and header information, the data transmission rate works out to 4800 bits per second.

More recently, the European Telecommunications Standards Institute (ETSI) has published another standard for DSR feature extraction and compression algorithms. European Telecommunications Standards Institute Standard ES 202 050, *Speech Processing, Transmission and Quality aspects (STQ); Distributed speech recognition; Advanced Front-end feature extraction algorithm; Compression algorithms*, Ver. 1.1.1, July 2002 (hereinafter "ETSI Advanced Front-End Standard"), hereby incorporated by reference in its entirety. The ETSI Advanced Front-End Standard is quite similar to the ETSI Front-End Standard in terms of the features extracted, bit rate, and so on but is more noise-robust. That is, the ETSI Advanced Front-End Standard provides better performance under noisy background conditions.

In summary, a DSR system, such as one designed in accordance with the ETSI Front-End Standard (or the ETSI Advanced Front-End Standard), offers many advantages for mobile communications network implementation. Such a system may provide equivalent recognition performance to an ASR system, but with a low complexity front-end that may be incorporated in a mobile unit and a low bandwidth requirement for the transmission of the coded recognition features.

DSR systems have the drawback that the original speech input is not available at the back end for storage and/or verification purposes. It would be helpful to have the original speech input available for: (i) back end applications that require human assistance, e.g., to permit hand correction of documents generated using remote dictation systems by allowing comparison of the document to the original speech input or to permit smooth transition when a recognition task is handed over from a DSR system to a human operator; (ii) prophylactic storage of legally sensitive information, e.g., to record the exact statements made during financial transactions such as the placement of a securities order; and (iii) validation of utterances during database collection, e.g., for training the recognizer in batch mode (and especially incremental mode) and system tune-up.

On the other hand, original speech is available at the back end if a standard ASR system is used. However, as noted above, ASR has significant distortion difficulties when used in a mobile or wireless application. In order to address this issue, U.S. patent application Publication No. 2002/0147579 (which is incorporated by reference herein) provides for a method for speech reconstruction at the back end using a sinusoidal vocoder. In accordance with the '579 application, 13 transmitted MFCCs ($C_0$–$C_{12}$) are transformed into harmonic magnitudes that are utilized in speech reconstruction.

The above technique for transforming MFCCs into harmonic magnitudes works fairly well. The speech reconstructed by a sinusoidal coder using these transformed magnitudes is highly intelligible and of reasonable quality. However, it is apparent that the reconstruction performance (in terms of speech intelligibility and quality) would be better if all the 23 MFCC values ($C_0$–$C_{22}$) were available instead of only the 13 transmitted values, viz., $C_0$–$C_{12}$. Therefore, a need exists for a method and apparatus for speech reconstruction within a distributed speech recognition system that makes use of missing MFCC values to improve speech reconstruction.

DETAILED DESCRIPTION OF THE DRAWINGS

To address the above-mentioned need, a method and apparatus for speech reconstruction within a distributed speech recognition system is provided herein. In accordance with the preferred embodiment of the present invention, the missing MFCCs are reconstructed—particularly, partial recovery of the missing MFCCs is achieved by exploiting the dependence of the missing MFCCs on the transmitted pitch period P as well as on the transmitted MFCCs. Harmonic magnitudes are then obtained from the transmitted and reconstructed MFCCs, and the speech is reconstructed utilizing these transformed magnitudes.

Because harmonic magnitudes are obtained utilizing all MFCCs (transmitted and reconstructed), an improvement in the accuracy of the transformed harmonic magnitudes results. Any improvement in the accuracy of the transformed harmonic magnitudes results in corresponding improvement in the intelligibility/quality of the reconstructed speech.

The present invention encompasses a method for speech reconstruction. The method comprises the steps of receiving a first plurality of Mel-frequency cepstral coefficients (MFCCs), calculating a second plurality of MFCCs, and utilizing the received and the calculated MFCCs for reconstructing speech.

The present invention additionally encompasses a method for speech reconstruction. The method comprising the steps of receiving Mel-frequency cepstral coefficients $C_0$–$C_{12}$, calculating Mel-frequency cepstral coefficients $C_{13}$–$C_{22}$, and utilizing coefficients $C_0$–$C_{22}$ for reconstructing speech.

Finally, the present invention encompasses an apparatus comprising a receiver receiving a first plurality of Mel-frequency cepstral coefficients (MFCCs), a MFCC reconstructor calculating a second plurality of MFCCs, and a speech processor utilizing the received and the calculated MFCCs for reconstructing speech.

Figure 1:
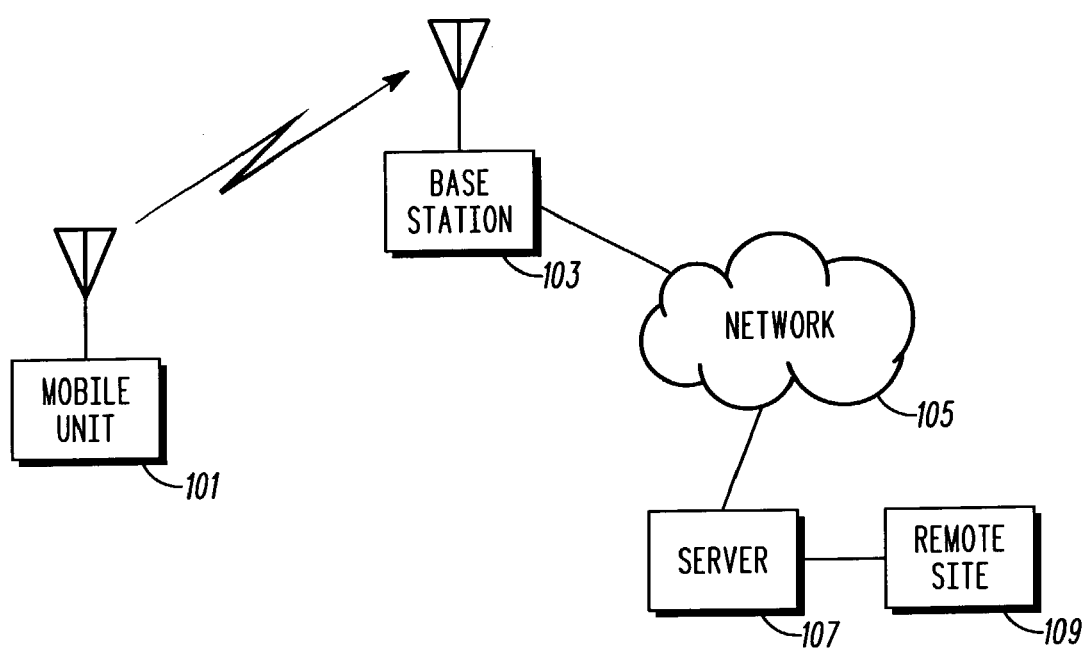
FIG. 1 is a block diagram of a distributed speech recognition system in accordance with the preferred embodiment of the present invention.

Turning now to the drawings, wherein like numerals designate like components, FIG. 1 is a block diagram of communication system 100 in accordance with the preferred embodiment of the present invention. Communication system 100 preferably comprises a standard cellular communication system such as a code-division, multiple-access (CDMA) communication system. Although the system 100 preferably is a mobile or wireless radio frequency communication system, the system 100 could be any type of communication system, for example a wired or wireless system or a system using a method of communication other than radio frequency communication.

Communication system 100 includes mobile communications device 101 (such as a mobile station) and fixed communications device 103 (such as a base station), mobile device 101 communicating with the fixed device 103 through the use of radio frequency transmissions. Base station 103, in turn, communicates with server 107 over a wired connection, as does server 107 with remote site 109. Using system 100, a user can communicate with remote site, and optionally with a user associated with remote site 109.

While only one mobile device 101, fixed device 103, server 107, and remote site 109 are shown in FIG. 1, it will be recognized that the system 100 may, and typically does, include a plurality of mobile devices 101 communicating with a plurality of fixed devices 103, fixed devices 103 in turn being in communication with a plurality of servers 107 in communication with a plurality of remote sites 109. For ease of illustration, a single mobile device 101, fixed device 103, server 107 and remote site 109 have been shown, but the invention described herein is not limited by the size of the system 100 shown.

Communication system 100 is a distributed speech recognition system as described in US2002/0147579 Method and Apparatus for Speech Reconstruction in a Distributed Speech Recognition System. As described in the '579 application mobile device 101 performs feature extraction and the server 107 performs feature matching. Communication system 100 also provides reconstructed speech at the server 107 for storage and/or verification. As discussed above, the communication system described in the '579 application utilizes a plurality of transmitted MFCCs to produce the harmonic magnitudes used for speech reconstruction. While the technique for transforming MFCCs into harmonic magnitudes works fairly well, the reconstruction performance (in terms of speech intelligibility and quality) would be better if all the 23 MFCC values ($C_0$–$C_{22}$) were available instead of only the 13 transmitted values, viz., $C_0$–$C_{12}$. In order to address this issue, in the preferred embodiment of the present invention, the non-transmitted MFCCs are reconstructed and the harmonic magnitudes are produced by utilizing both the non-transmitted, reconstructed MFCCs as well as the transmitted MFCCs.

Figure 2:
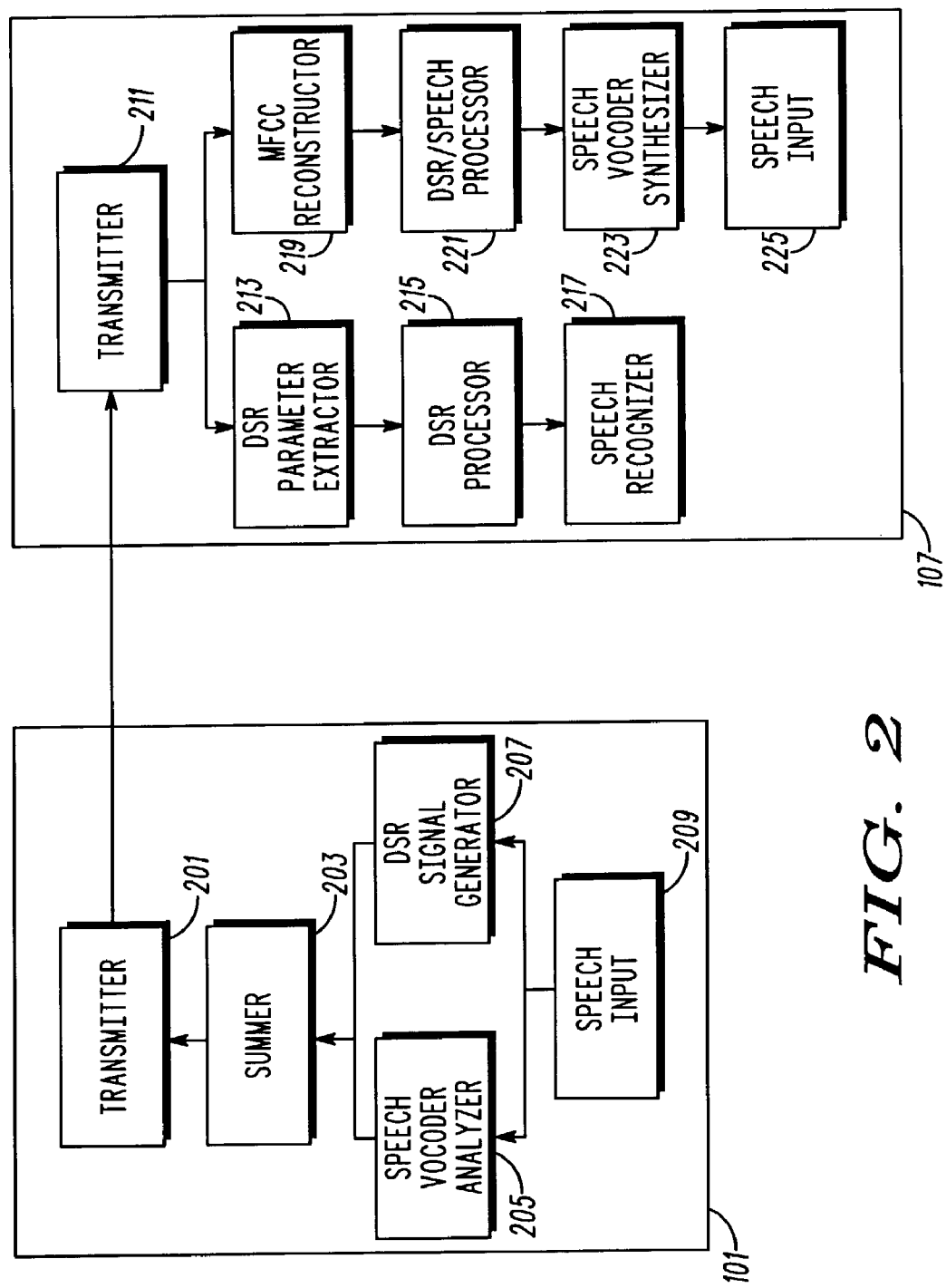
FIG. 2 is a more-detailed block diagram of the distributed speech recognition system of FIG. 1 in accordance with the preferred embodiment of the present invention.

FIG. 2 is a more-detailed block diagram of the distributed speech recognition system of FIG. 1 in accordance with the preferred embodiment of the present invention. As is evident, the distributed speech recognition system is similar to the distributed speech recognition system of the '579 application except for the addition of MFCC reconstructor 219.

As shown mobile device 101 includes speech input device 209 (such as a microphone), which is coupled to DSR signal generator 207 and speech vocoder-analyzer 205. DSR signal generator 207 extracts the spectral data about the speech input received via speech input device 209, and generates a coded signal which is representative of the spectral data.

Vocoder-analyzer 205 extracts additional data about the speech input which may be used to reconstruct the speech at the back end.

Summer 203 combines the coded signal from the DSR signal generator 207 and the additional data extracted by vocoder-analyzer 205 into a unified signal, which is passed to transmitter 201 coupled to summer 203. Transmitter 201 is a radio frequency transmitter or transceiver, although as the method according to the present invention could be used with other types of communication systems, in which case the transmitter would be selected to be compatible with whatever system is selected.

DSR signal generator operates as follows in a system designed in accordance with the ETSI Front-End Standard: The speech input is converted from analog to digital, for example at a sampling frequency ($F_s$) of 8000 samples/second and 16 bits/sample. The digitized speech is passed through a DC-offset removal filter, and divided into overlapping frames. Frame size is dependant on the sampling frequency. For the ETSI Front-End Standard, which accommodates three different sampling frequencies of 8, 11, and 16 kHz, the possible frame sizes are 200, 256, and 400 samples, respectively.

The frame energy level is computed and its natural logarithm is determined. The resultant value is also referred to as the log-energy value. The framed, digitized speech signal is then passed through a pre-emphasis filter to emphasize the higher frequency components. Each speech frame is then windowed (e.g., using a Hamming window), and transformed into the frequency domain using a Fast Fourier Transform ("FFT"). Similar to the frame size, the size of the FFT used depends on the sampling frequency, for example a 256-point FFT is used for 8 and 11 kHz sampling frequencies and a 512-point FFT is used for a 16 KHz sampling frequency.

The FFT magnitudes in the frequency range between 64 Hz and $F_s/2$ (for example, 4 kHz for a sampling frequency of 8 kHz) are then transformed into the Mel-frequency domain by a process known as Mel-filtering. A transformation into the Mel-frequency domain is performed because psychophysical studies have shown that human perception of the frequency contents of sounds for speech signals does not follow a linear scale. Accordingly, for each tone with an actual frequency, f, measured in Hz, a subjective pitch may be represented on a second scale, which is referred to as the Mel-frequency scale.

The Mel-filtering process is as follows. First, the frequency range (e.g., 64 Hz to 4000 Hz) is warped into a Mel-frequency scale using the expression:

$$Mel(f) = 2595.0 * \log_{10}\left(1 + \frac{f}{700.0}\right).$$

Using this equation, the Mel-frequencies corresponding, for example, to frequencies of 64 Hz and 4000 Hz are 98.6 and 2146.1, respectively. This Mel-frequency range is then divided into 23 equal-sized, half-overlapping bands (also known as channels or bins), each band 170.6 wide and the center of each band 85.3 apart. The center of the first band is located at 98.6+85.3=183.9, and that of the last band is located at 2146.1−85.3=2060.8. These bands of equal size in the Mel-frequency domain correspond to bands of unequal sizes in the linear frequency domain with the size increasing along the frequency axis. The FFT magnitudes falling inside each band are then averaged (filtered) using a triangular weighting window (with the weight at the center equal to 1.0 and at either end equal to 0.0). The filtered band outputs are then subjected to a natural logarithm operation.

The 23 log-spectral values generated are then transformed into the cepstral domain by means of a 23-point DCT (Discrete Cosine Transform). It should be noted that only the first 13 values ($C_0$ through $C_{12}$) are calculated, with the remaining ten values ($C_{13}$ through $C_{22}$) being discarded, i.e., not computed. The frame log-energy and the 13 cepstral values (also referred to as Mel-Frequency Cepstral Coefficients, or MFCCs) are then compressed (quantized) and transmitted to fixed device 107. For communication system 100 operating according to the ETSI Front-End Standard, the MFCC and log-energy values are updated every 10 ms.

As mentioned above, vocoder-analyzer 205 also receives the speech input. In particular, vocoder-analyzer 205 analyzes the input to determine other data about the speech input which may be used by server 107 in addition to the data derivable from the DSR-coded speech to reconstruct the speech. The exact data extracted by vocoder-analyzer 205 is dependent upon the characteristics of the speech vocoder associated with server 107 which will be synthesizing the reconstructed speech. For example, Code Excited Linear Predictive (CELP) vocoders require codebook indices for each sub-frame of speech to be prepared. For parametric vocoders (e.g., sinusoidal vocoders), additional excitation data may be required, such as the class (voiced, unvoiced, etc.) and the pitch period as well as higher-resolution energy data such as the sub-frame energy levels.

One will recognize that the quality of speech synthesized by CELP coders falls rapidly when the bit rate is reduced below about 4800 bps. On the other hand, parametric vocoders provide reasonable speech quality at lower bit rates. Since one of the main requirements of a DSR system is low data transmission rate, a parametric vocoder, specifically a sinusoidal vocoder, will be typically used in server 107. Consequently, according to the preferred embodiment of the invention, speech vocoder-analyzer 205 determines class, pitch period and sub-frame energy data for each speech frame, although optionally the sub-frame energy data may be omitted because the sub-frame energies may be computed by interpolation from the log-energy value.

Vocoder-analyzer 205 preferably operates on a frame size of approximately 20 ms, i.e., the parameters are transmitted once every 20 ms. In each frame, 2 bits are used for the class parameter, i.e., to indicate whether a frame is non-speech, voiced, unvoiced, mixed-voiced, etc. The speech/non-speech classification is preferably done using an energy-based Voice Activity Detector (VAD), while the determination of voicing level is based on a number of features including periodic correlation (normalized correlation at a lag equal to a pitch period), a periodic energy ratio (ratio of energies of decorrelated and original frames), and high-frequency energy ratio. The pitch period parameter, which provides information about the harmonic frequencies, can typically be represented using an additional 7 bits for a typical pitch frequency range of about 55 Hz to 420 Hz. The pitch period is preferably estimated using a time-domain correlation analysis of low-pass filtered speech. If the higher-resolution energy data, e.g., sub-frame energy, parameter is to be transmitted, this may be accomplished using an additional 8 bits. The sub-frame energies are quantized in the log-domain by a 4-dimensional VQ, with the energy for non-speech and unvoiced speech frames computed over a sub-frame (4 sub-frames per frame) and the energy for voiced frames computed over a pitch period. As an alternative, the sub-frame energies may be combined with the log-energy value to reduce the bit rate.

Assuming that class, pitch period, and sub-frame energy values are transmitted every 20 ms, i.e., once for every two DSR frames if an ETSI Standard system is used, approximately 800 to 850 bps will be added to the data transmission rate. If the additional energy data is not transmitted, as little as 450 bps may be added to the data transmission rate.

The detailed structure of server 107 is now discussed with reference to the right-half of FIG. 2. Receiver 211 (which is a radio-frequency (RF) receiver) is coupled to conventional DSR parameter extractor 213 and MFCC reconstructor 219. The DSR parameter extractor 213 is coupled to conventional DSR processor 215 and conventional speech recognizer 217 to compare the encoded data with a known data set, while the MFCC reconstructor 219 is coupled to DSR/speech processor 221, which in turn is coupled to speech vocoder-synthesizer 223 (as indicated previously, preferably a sinusoidal speech vocoder-synthesizer) and speech output (e.g., speaker) 225.

During operation, receiver 211 receives pitch period P as well as the transmitted MFCCs, $C_0$–$C_{12}$. These are passed to MFCC reconstructor 219 where the non-transmitted MFCCs are reconstructed. Exact recovery of the missing coefficients is not possible. However, a partial recovery can be achieved by exploiting the dependence of the missing MFCCs (in this case $C_{13}$–$C_{22}$), on the transmitted pitch period P as well as on the transmitted MFCCs, $C_0$–$C_{12}$. In a first embodiment, a lookup table is utilized to generate the missing MFCCs.

In order to exploit the dependence between the missing MFCCs and the pitch period, a large database of speech signals is utilized to extract the relevant information, (pitch period and the missing MFCCs) for each "voiced" frame within the database. The pitch period range [$P_{MIN}$, $P_{MAX}$] is then divided into different groups $G_1, G_2, \ldots, G_M$ and the missing MFCC vectors corresponding to each group are separated. The average of the missing MFCC vectors corresponding to each group is next computed and stored. These average vectors $D_1, D_2, \ldots, D_M$ (of dimension 10) represent the partially recovered missing MFCCs as a function of the pitch period. In actual operation, i.e., during speech reconstruction at the back-end, the pitch period P is used to identify the appropriate group $G_m$ and use the corresponding (pre-stored) average vector $D_m$ for the missing MFCC values $C_{13}$–$C_{22}$. All MFCC values (actual and generated) are then passed to DSR/speech processor 221.

DSR/speech processor 221 includes a program which controls the DSR/speech processor 221 to determine and decode the DSR-encoded spectral data, and in particular the harmonic magnitudes. First, the MFCC values corresponding to the impulse response of the pre-emphasis filter are subtracted from the received MFCC values to remove the effect of the pre-emphasis filter as well as the effect of the Mel-filter. Next, the MFCC values are inverted to compute the log-spectral value for each desired harmonic frequency. The log-spectral values are then exponentiated to get the spectral magnitude for the harmonics. Typically, these steps are performed every 20 ms, although the calculations may be made more frequently, e.g., every 10 ms.

Figure 3:
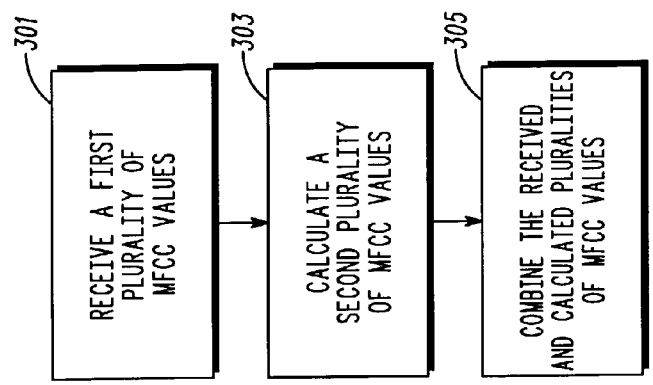
FIG. 3 is a flow chart showing operation of an MFCC reconstructor in accordance with the preferred embodiment of the present invention.

FIG. 3 is a flow chart showing operation of the MFCC reconstructor of FIG. 2 in accordance with the preferred embodiment of the present invention. The logic flow begins at step 301 where a first plurality of MFCC values are received. As discussed above, only the first 13 values ($C_0$ through $C_{12}$) are transmitted to receiver 211, with the remaining ten values ($C_{13}$ through $C_{22}$) being discarded by mobile unit 101. At step 303 MFCC reconstructor 219 calculates the missing MFCC values. Finally, at step 305 MFCC reconstructor 219 combines the received MFCC values ($C_0$ through $C_{12}$) with the calculated MFCC values ($C_{13}$ through $C_{22}$) to generate the full-length MFCC vector ($C_0$ through $C_{22}$) and feed it to the DSR/Speech Processor 221.

Figure 4:
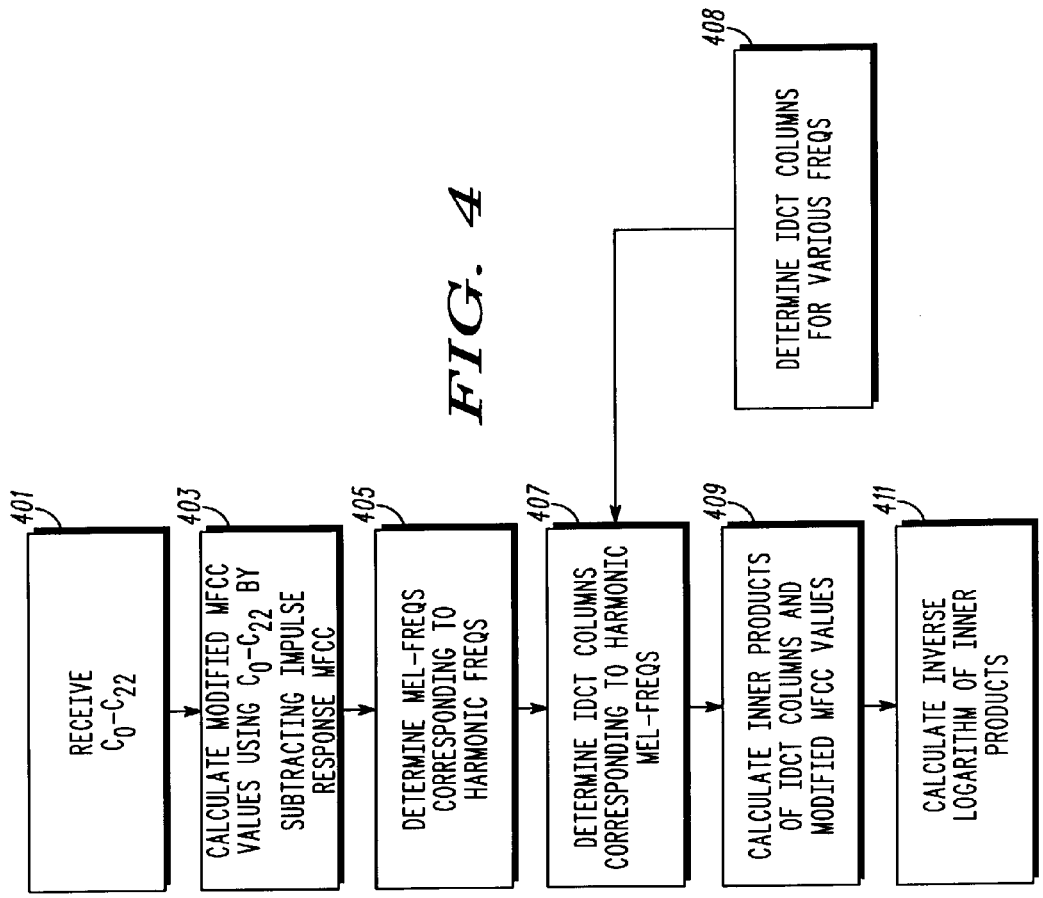
FIG. 4 is a flow chart showing operation of a DSR/Speech processor in accordance with the preferred embodiment of the present invention.

FIG. 4 is a flow chart showing operation of DSR/Speech processor 221 in accordance with the preferred embodiment of the present invention. The logic flow begins at step 401 where both the transmitted MFCC values ($C_0$–$C_{12}$) and the reconstructed MFCC values ($C_{13}$–$C_{22}$) are received. At a step 403, the MFCC values $C_0$–$C_{22}$ corresponding to the impulse response of the pre-emphasis filter are subtracted from the received MFCC values principally to remove the effect of the pre-emphasis filter. Alternatively, the effect of the pre-emphasis filter may be removed as a last step by dividing the spectral magnitude of the harmonic frequency by the impulse response of the pre-emphasis filter at that corresponding harmonic frequency. However, in addition to the pre-emphasis filter, the Mel-filter emphasizes higher frequencies because of the increasing width of the frequency bands along the linear frequency axis. The Mel-filter impulse response at any band center can be taken to be the width of the corresponding band, and for any other frequency, an interpolated value can be used. By computing a combined impulse response of the pre-emphasis filter and the Mel-filter, the effect of both filters can be removed in a single step by dividing the spectral magnitude of the harmonic frequency by the combined impulse response at that corresponding harmonic frequency. The step 403 achieves the same result.

The modified MFCC values with the effect of the pre-emphasis filter and the Mel-filter removed are then used to estimate the spectral magnitudes according to the following steps. The Mel-frequencies corresponding to the harmonic frequencies (derivable from the pitch period) are determined at a step 405. An inverse discrete cosine transform (IDCT) is then performed on the modified MFCC values at the harmonic Mel-frequencies to transform the cepstral coefficients into log-spectral values at steps 407, 409.

That is, a 23-point IDCT of the MFCC values $C_0$ through $C_{22}$ would restore the original 23 log-spectral values except for the distortion caused by the quantization error in the MFCC values $C_0$ through $C_{12}$ and the reconstruction error in the MFCC values $C_{13}$ through $C_{22}$. These log-spectral values correspond, however, to the centers of the 23 frequency bands. The log-spectral values at other frequencies are required to determine the transformed MFCC values for the harmonic frequencies.

To increase the sampling resolution, the IDCT size can be increased by an odd multiple of 23, that is (2K+1)*23, where K>0. This introduces K additional Mel-frequency points on either side of the 23 original Mel-frequencies corresponding to the centers of the frequency bands. For example, if K=85, there are 85 additional Mel-frequency points to the left of the first frequency band center and to the right of the last (i.e., $23^{rd}$) frequency band center, and 170 additional Mel-frequency points between any two consecutive frequency band centers. The total number of Mel-frequency points, in this case, is 171*23=3933. For $F_s$=8000 Hz, the centers of the frequency bands are 85.3 apart in Mel-frequency scale, and the choice of K=85 increases the resolution such that consecutive Mel-frequency points are only 85.3/171=0.499 apart. It is important to note that the leftmost and rightmost Mel-frequency points of the IDCT do not correspond to 0 and $F_s/2$ (e.g., 4000 Hz) in linear frequency scale. For our example, the leftmost Mel-frequency point is at 183.9–

85*0.499=141.48, and the rightmost Mel-frequency point is at 2060.8+85*0.499=2103.2. The corresponding points in the linear frequency scale are respectively 93.6 Hz and 3824.6 Hz. One way to handle frequencies not covered by the IDCT frequency range is to use the nearest frequency point, i.e., frequencies below 93.6 Hz are assigned the frequency point at 93.6 Hz, and similarly frequencies above 3824.6 Hz are assigned the frequency point at 3824.6 Hz. An alternate method is to use some type of interpolation.

The higher resolution IDCT essentially interpolates between the Mel-frequency band centers using the DCT basis functions themselves as the interpolating functions. However, it is not necessary to perform a 3933-point IDCT. Instead, to facilitate computation of the IDCT at selected frequency points, a 12×3933 matrix L of IDCT values may be optionally pre-computed at a step 408 using the equation:

$$L_{i,j} = \left(\frac{2}{23}\right)\cos\left(\frac{(2j+1)*i*\pi}{2*23*171}\right),$$

where i=1, 2, . . . , 12 and j=0, 1, . . . , 3932. The zeroth row corresponding to $C_0$ is implicit and need not be stored since its value is constant at 1/23 for all columns.

Given this matrix L, to get the log-spectral value at any given Mel-frequency, the nearest Mel-frequency point for which the IDCT has been calculated is located, the corresponding column vector of the matrix L is selected, and an inner product between the corresponding column and the modified MFCC vector $[C_0, C_1, \ldots, C_{22}]$ is formed. Consequently, to determine the log-spectral values for the harmonic frequencies, for example, the nearest Mel-frequency points are located and the corresponding column vectors of the matrix L selected at the step 407. Further, at the step 409, the inner products are formed between the modified MFCC vector and the column vectors of matrix L selected at the step 407. The transformed coefficients are then exponentiated to compute the spectral magnitudes at a step 411.

The sinusoidal speech vocoder-synthesizer 223 uses these spectral magnitudes, along with the data regarding the frame energy and other data (such as class, pitch period, and sub-frame energy) also extracted by the DSR/speech processor 221 under the control of the afore-mentioned program, to reconstruct the speech as the sum of a number of sinusoidal signals with different frequencies, amplitudes, and phases. In particular, the synthesizer reconstructs speech using a sinusoidal model of speech production:

$$s(j) = \sum_k A_{k,j}\cos(\Phi_{k,j})$$

where the speech sample s(j) is synthesized as the sum of a number of harmonically related sinusoids with amplitude $A_{k,j}$ and phase $\Phi_{k,j}$, j being the sample index and k being the harmonic index.

Typically, the synthesis process starts with the computation of the frequencies, amplitudes, and phases at the midpoint of each frame. The frequencies used are the pitch frequency and its harmonics, which can be computed using the pitch period. The amplitudes used may be the harmonic amplitudes, which may be estimated using the spectral amplitudes determined using the method discussed above and the sub-frame energy corresponding to the midpoint of the frame (or an interpolation thereof using the log-energy value). Alternatively, for unvoiced speech for example, the amplitudes may correspond to a set of frequencies not necessarily identical to the harmonic frequencies, in which case these amplitudes may be estimated using the general form of the method described above and the sub-frame energy corresponding to the midpoint of the frame (or an interpolation thereof using the log-energy value). The phases computed depend on the class parameter. For voiced speech, coherent phases are computed. For unvoiced speech, random, non-coherent, phases are computed. For mixed-voiced speech, the voiced model is used for lower frequencies and the unvoiced model is used for higher frequencies. Any linear phase component is removed from the modeled phases.

Once the midpoint frequency, amplitude and phase values are known, the amplitudes and phases at other points may be calculated. For example, once the amplitudes at the midpoints of the current and previous voiced frames are known, the amplitudes at the sub-frame boundaries may be calculated using linear interpolation with an adjustment for the energies at these points. Amplitudes within a sub-frame may also be calculated using linear interpolation. The harmonic phases at different sample indices may be calculated by allowing the phases to evolve linearly according to the frequency. The frequencies are allowed to change at the sub-frame boundaries in equal steps from the previous values to the current values. Any phase discontinuities arising out of this evolution are resolved using linear phase correction factors (i.e., slight frequency shifts). If the previous and current frames are of different classes (e.g., one is voiced and the other is unvoiced) or both are voiced but the pitch periods are quite different, e.g., doubling, the two frames are synthesized independently and overlap-added in the time-domain.

While the invention has been particularly shown and described with reference to a particular embodiment, it will be understood by those skilled in the art that various changes in form and details may be made therein without departing from the spirit and scope of the invention. For example, although the non-transmitted MFCCs were derived utilizing a pitch period and a lookup table, in alternate embodiments of the present invention the non-transmitted MFCCs may be derived in any number of ways. For example, a single, pre-stored vector can be utilized for the missing MFCCs. In particular, the mean of the missing MFCC vectors of dimension 10 ($C_{13}$ through $C_{22}$)_ corresponding to the "voiced" frames of a large speech database can be computed off-line, pre-stored, and utilized for the missing MFCCs during speech reconstruction.

Additionally the missing MFCCs can be derived from the transmitted MFCCs. In particular, the transmitted ($C_0$ through $C_{12}$) MFCC values (which have been quantized), and the missing ($C_{13}$ through $C_{22}$) MFCC values (which have not been quantized) of all the "voiced" frames from a large speech database can be gathered and partitioned into a suitable number of groups $H_1, H_2, \ldots, H_K$. This grouping is similar to the "voronoi" regions in a vector quantizer and uses the Euclidean distance measure based on the first 13 MFCC values ($C_0$ through $C_{12}$). That is, a MFCC vector ($C_0$ through $C_{22}$) belongs to a group $H_k$ if and only if the 13-dimensional sub-vector ($C_0$ through $C_{12}$) is closer (in terms of the Euclidean distance measure) to the centroid of the group (formed by taking the mean of all the 13-dimensional sub-vectors belonging to the group) than the centroid of any other group. A technique similar to the design of a vector quantizer can be used to form these groups. Since the first MFCC value $C_0$ approximately represents the energy of the frame and may not have any useful information regarding the missing MFCCs, it may be dropped from consideration in the formation of the groups—that is, we may use the 12-dimensional sub-vectors ($C_1$ through $C_{12}$) instead of the 13-dimensional sub-vectors ($C_0$ through $C_{12}$) while forming the groups. Once the groups have been formed, the mean of the 10 dimensional sub-vectors ($C_{13}$ through $C_{22}$) corresponding to the missing MFCC values in a DSR system of all the vectors in each group can be calculated and pre-stored as $E_1, E_2, \ldots, E_K$. For speech reconstruction at the back-end of a DSR system, given the transmitted MFCC values ($C_0$ through $C_{12}$) for a particular frame, we first find out which particular group it belongs to (say $H_k$), and then use the corresponding mean vector $E_k$ to substitute for missing MFCC values ($C_{13}$ through $C_{22}$). This technique which uses the transmitted MFCC values in the selection of the missing MFCC values can be combined with the pitch period based selection technique mentioned earlier. That is, we first use the pitch period range to form suitable groups $G_1, G_2, \ldots, G_M$ of 23-dimensional vectors ($C_0$ through $C_{22}$) of all "voiced" frames from a large speech database and then sub-divide each of these groups further based on the transmitted MFCC values. For example, the group $G_m$ will be sub-divided into the groups $G_{m,1}, G_{m,2}, \ldots, G_{m,K}$ based on the transmitted MFCC values ($C_0$ through $C_{12}$). The 10-dimensional mean vectors corresponding to $C_{13}$ through $C_{22}$ of all the sub-groups totaling M*K are pre-computed and stored. During speech reconstruction, the pitch period value P and the transmitted MFCC values ($C_0$ through $C_{12}$) are both used in selecting the appropriate pre-stored vector to substitute for the missing MFCC values ($C_{13}$ through $C_{22}$). It is intended that such changes come within the scope of the following claims.

The invention cliamed is:

1. A method for speech reconstruction, the method comprising the steps of:
    receiving a first plurality of Mel-frequency cepstral coefficients (MFCCs);
    calculating a second plurality of MFCCs; and
    utilizing the received and the calculated MFCCs for reconstructing speech.

2. The method of claim 1 wherein the step of utilizing the received and the calculated MFCCs for reconstructing speech comprises the steps of:
    transforming the received and the calculated MFCCs into harmonic magnitudes; and
    utilizing the harmonic magnitudes for reconstructing the speech.

3. The method of claim 1 wherein the step of receiving the first plurality of MFCCs comprises the step of receiving coefficients $C_0$–$C_{12}$.

4. The method of claim 3 wherein the step of calculating the second plurality of MFCCs comprises the step of calculating coefficients $C_{13}$ through $C_{22}$.

5. The method of claim 4 wherein the step of utilizing the received and the calculated MFCCs for reconstructing speech comprises the steps of:
    transforming coefficients $C_0$ through $C_{22}$ into harmonic magnitudes; and
    utilizing the harmonic magnitudes for reconstructing the speech.

6. The method of claim 1 wherein the step of receiving the first plurality of MFCCs comprises the step of receiving the first plurality of MFCCs via an over-the-air communication link.

7. The method of claim 1 further comprising the step of:
    receiving a pitch period along with the first plurality of MFCCs.

8. The method of claim 1 wherein the step of calculating the second plurality of MFCCs comprises the step of calculating the second plurality of MFCCs, wherein the second plurality of MFCCs are based on the pitch period.

9. The method of claim 1 wherein the step of calculating the second plurality of MFCCs comprises the step of utilizing a single, pre-stored vector for the second plurality of MFCCs.

10. The method of claim 1 wherein the step of calculating the second plurality of MFCCs comprises the step of deriving the second plurality of MFCCs from the first plurality of MFCCs.

11. A method for speech reconstruction, the method comprising the steps of:
    receiving Mel-frequency cepstral coefficients $C_0$–$C_{12}$;
    calculating Mel-frequency cepstral coefficients $C_{13}$–$C_{22}$; and
    utilizing coefficients $C_0$–$C_{22}$ for reconstructing speech.

12. The method of claim 11 wherein the step of utilizing coefficients $C_0$–$C_{22}$ for reconstructing speech comprises the steps of:
    transforming the coefficients $C_0$–$C_{22}$ into harmonic magnitudes; and
    utilizing the harmonic magnitudes for reconstructing the speech.

13. The method of claim 11 wherein the step of receiving coefficients $C_0$–$C_{12}$ comprises the step of receiving coefficients $C_0$–$C_{12}$ via an over-the-air communication link.

14. The method of claim 11 further comprising the step of:
    receiving a pitch period along with coefficients $C_0$–$C_{12}$.

15. The method of claim 14 wherein the step of calculating coefficients $C_{13}$–$C_{22}$ comprises the step of calculating coefficients $C_{13}$–$C_{22}$ based on the pitch period.

16. The method of claim 11 wherein the step of calculating coefficients $C_{13}$–$C_{22}$ comprises the step of utilizing a single, pre-stored vector for coefficients $C_{13}$–$C_{22}$.

17. The method of claim 11 wherein the step of calculating coefficients $C_{13}$–$C_{22}$ comprises the step of deriving coefficients $C_{13}$–$C_{22}$ from the coefficients $C_0$–$C_{12}$.

18. An apparatus comprising:
    a receiver receiving a first plurality of Mel-frequency cepstral coefficients (MFCCs);
    a MFCC reconstructor calculating a second plurality of MFCCs; and
    a speech processor utilizing the received and the calculated MFCCs for reconstructing speech.

19. The apparatus of claim 18 wherein the receiver is a radio-frequency (RF) receiver.

20. The apparatus of claim 18 wherein:
    the first plurality of MFCCs comprise coefficients $C_0$–$C_{12}$; and
    the second plurality of MFCCs comprise coefficients $C_{13}$–$C_{22}$.

* * * * *